United States Patent [19]

Biskup

[11] 4,123,079
[45] Oct. 31, 1978

[54] OCCUPANT PROPELLED CAMBERING VEHICLE

[75] Inventor: Edward J. Biskup, Birmingham, Mich.

[73] Assignee: General Motors Corporation, Detroit, Mich.

[21] Appl. No.: 779,337

[22] Filed: Mar. 21, 1977

[51] Int. Cl.² .............................................. B62M 1/04
[52] U.S. Cl. ..................... 280/220; 280/275; 280/278
[58] Field of Search ............... 280/220, 221, 275, 282, 280/218, 293, 87.04 R, 112 A, 12.1, 16, 263, 270, 278

[56] References Cited

U.S. PATENT DOCUMENTS

| | | | |
|---|---|---|---|
| 2,593,974 | 4/1952 | Brown | 280/21 R |
| 2,835,499 | 5/1958 | Andren et al. | 280/293 X |
| 3,033,585 | 5/1962 | Marston et al. | 280/12.1 X |
| 3,479,050 | 11/1969 | Bloise | 280/112 R X |
| 3,480,289 | 11/1969 | Larkin | 280/21 R |
| 3,572,456 | 3/1971 | Healy | 280/112 A X |
| 3,841,649 | 10/1974 | McMullen | 280/16 |
| 4,050,713 | 9/1977 | Williams | 280/112 A X |

FOREIGN PATENT DOCUMENTS

| | | | |
|---|---|---|---|
| 169,408 | 3/1951 | Austria | 280/16 |
| 178,275 | 9/1953 | Austria | 280/16 |
| 49-42,586 | 11/1974 | Japan | 280/282 |

OTHER PUBLICATIONS

Shimpo Industries Brochure; p. 1-4; 3-20-77.

Primary Examiner—Kenneth H. Betts
Attorney, Agent, or Firm—Edward J. Biskup

[57] ABSTRACT

A three-point cambering vehicle having an upright steering frame supporting a steerable contact and a pair of rearwardly positioned and laterally spaced contacts which are connected to the steering frame through spring means for allowing cambering of the vehicle when the operator leans into a turn.

4 Claims, 6 Drawing Figures

U.S. Patent Oct. 31, 1978 Sheet 3 of 3 4,123,079
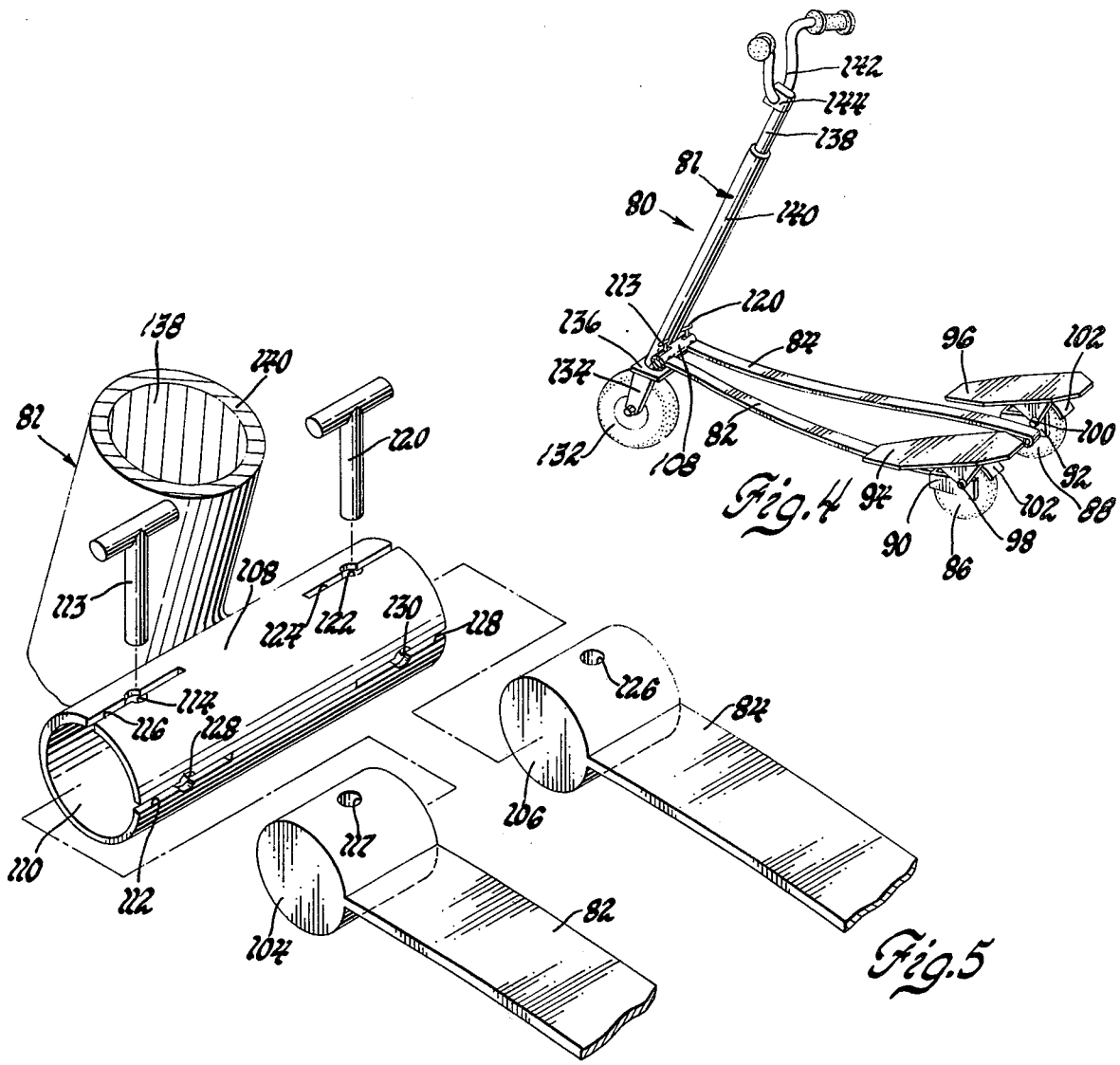
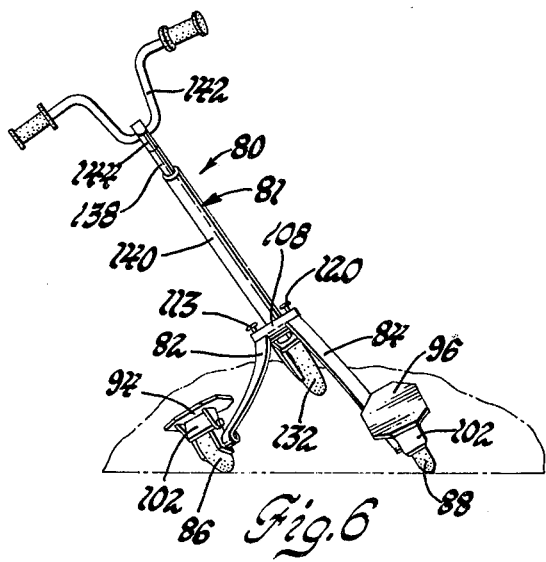

OCCUPANT PROPELLED CAMBERING VEHICLE

This invention concerns cambering vehicles and more particularly a three-point cambering vehicle having a steerable front contact and laterally spaced rear contacts supported through spring means so as to provide for cambering and engagement with a support surface during cornering and other maneuvers.

Copending patent application Ser. No. 649,967 filed on Jan. 19, 1976, now U.S. Pat. No. 4,087,106, and entitled "Cambering Vehicle" discloses a novel, lightweight cambering vehicle which has a steerable front ground contact means and laterally spaced rear ground contact means. The rear ground contact means are mounted on trailing arms the terminal portions of which are swingable in opposite up and down directions under the control of cambering device to permit the vehicle to be cambered when the operator tilts the vehicle during cornering maneuvers. This arrangement provides a three-point contact vehicle with the contact means taking the form of wheels, skis, or ice skates. The wheeled vehicle can be powered by an internal combustion engine or an electric motor or if desired, can be manually powered through the natural input from the vehicle operator by the timed shifting of weight from one foot to the other onto the rear ends of the trailing arms. A vehicle of this type can be used as a recreational vehicle when equipped with skis or ice skates or as a short distance general utility or people mover vehicle when equipped with wheels.

The present invention concerns cambering vehicles of the above-described type and is directed more specifically to a cambering vehicle which relies on spring means for allowing the trailing arms to move in opposite directions and provide cambering of the vehicle. According to the invention, a three-point surface contact cambering vehicle is provided comprising an upright steering frame including a steering column which rotatably supports an elongated steering shaft for turning movement about a substantially vertical axis. A steerable front surface contact means is operatively connected to the lower end of the steering shaft for engagement with a support surface. A manual steering device is fixed with the upper end of the steering shaft and provides for turning movement of the front surface contact means. In one form of the invention, a pair of elongated trailing arms extend rearwardly from the steering column and have the rear portions thereof spaced laterally from each other with each supporting a rear surface contact means for engagement with the support surface. Foot support means for an operator of the vehicle is mounted on each of the trailing arms adjacent to the associated rear surface contact means. The forward ends of each trailing arms are connected to the steering column through a torsion bar which is mounted at the lower end of the steering column. The arrangement is such that the torsion bar permits the trailing arms to swing about a transverse axis to allow the operator to roll the vehicle with respect to the longitudinally extending roll axis thereof causing the trailing arms to move in opposite directions so that the rear surface contact means camber by an amount substantially equal to the vehicle roll.

In another form of the invention the trailing arms take the form of a leaf spring, the forward ends of which are rigidly connected to the lower end of the steering column at laterally spaced points. In this case the trailing arms extend rearwardly in diverging directions with the rear end of each trailing arm supporting a surface contact member and a foot support pad for the vehicle operator. As in the case of the torsion bar, the spring design of the trailing arms allows the operator to roll the vehicle so as to provide cambering and continuous engagement with the support surface during cornering and other maneuvers.

The objects of the present invention are to provide a new and improved cambering vehicle having trailing arms which through spring means permit the vehicle to roll about its longitudinal roll axis while permitting the surface contact members to maintain contact with the support surface; to provide a new and improved cambering vehicle in which the trailing arms are connected to the upright steering frame by spring means which allow pivotal movement of the arms so as to permit the vehicle to camber when the operator leans into a turn; to provide a new and improved cambering vehicle employing a torsion bar which serves to connect the forward end of the trailing arms to the upright steering frame and permits each of the trailing arms to pivot in a plane substantially parallel to the plane of the other trailing arm during turning maneuvers; to provide a new and improved cambering vehicle in which leaf springs serve as the trailing arms and permit cambering of the vehicle while maintaining continuous contact with the support surface; and to provide a new and improved cambering vehicle in which the trailing arms are connected to the upright steering frame through spring means which can be adjustably positioned between a normally operating position and a folded position wherein the trailing arms are located adjacent to and extend in a generally same direction as the steering frame so as to provide a compact vehicle to facilitate stowage thereof.

Other objects and advantages of the present invention will be more apparent from the following detailed description when taken with the drawings in which:

FIG. 4 is a perspective view showing another embodiment of the invention;

FIG. 5 is an enlarged perspective view showing the construction of the portion of the steering column which supports the front ends of the leaf springs which constitute the trailing arms of the vehicle design shown in FIG. 4; and FIG. 6 shows the vehicle of FIG. 4 when viewed from the rear and being leaned into a turn.

Figure 1:
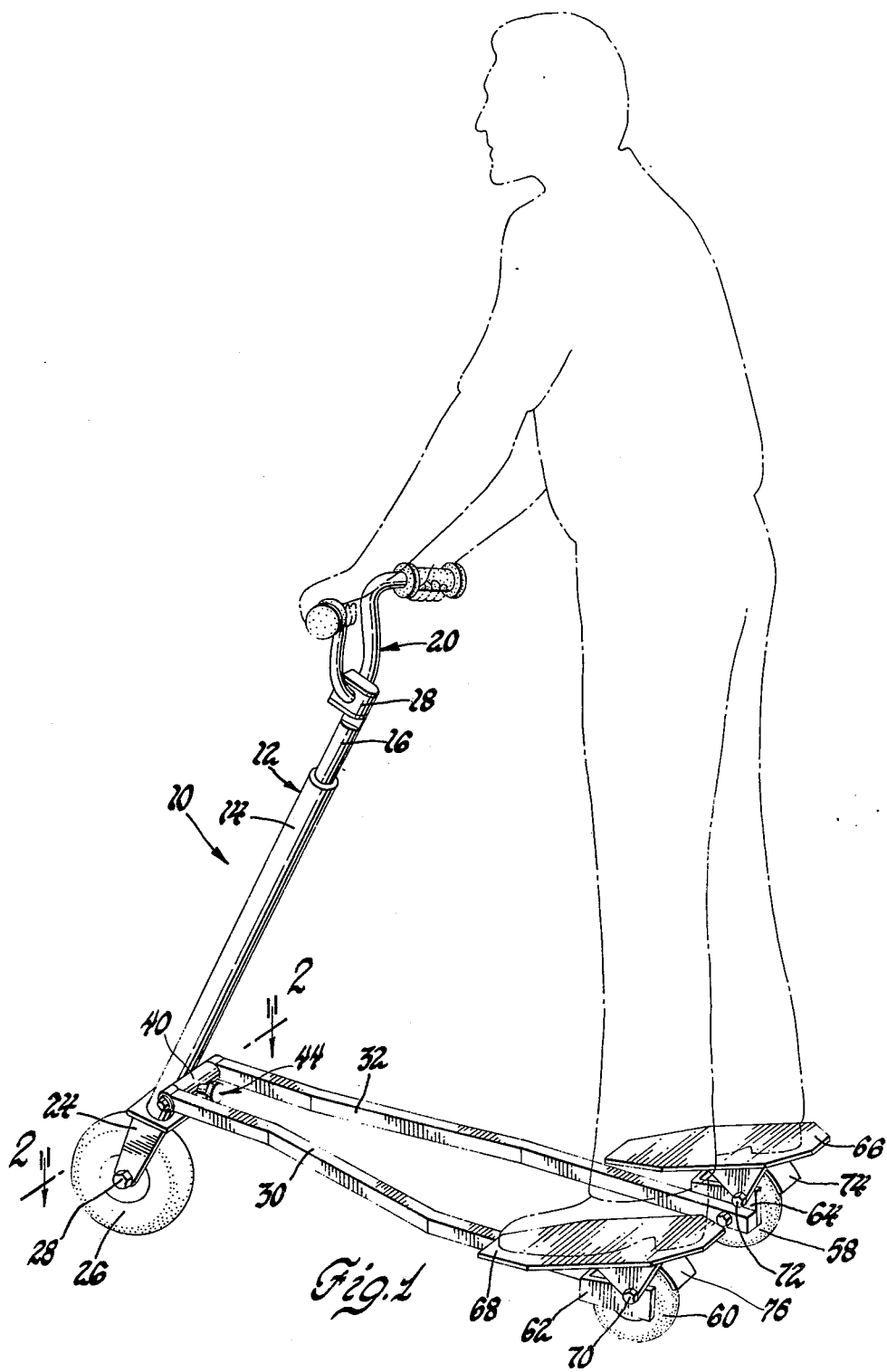
FIG. 1 is a perspective view showing a cambering vehicle made in accordance with the invention.
Figure 2:
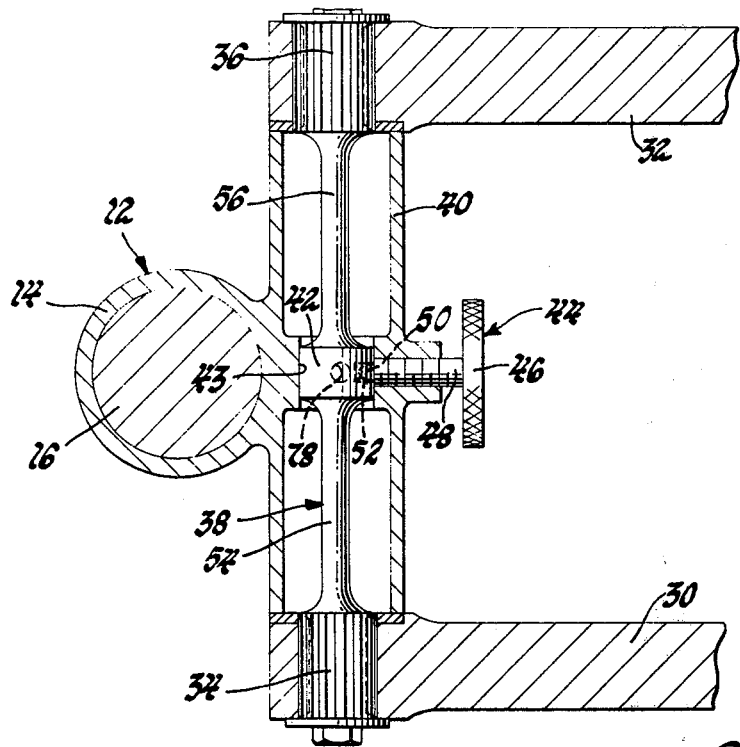
FIG. 2 is an enlarged sectional view taken on line 2—2 and shows the torsion bar which serves to join the forward ends of the trailing arms to the steering frame.
Figure 3:
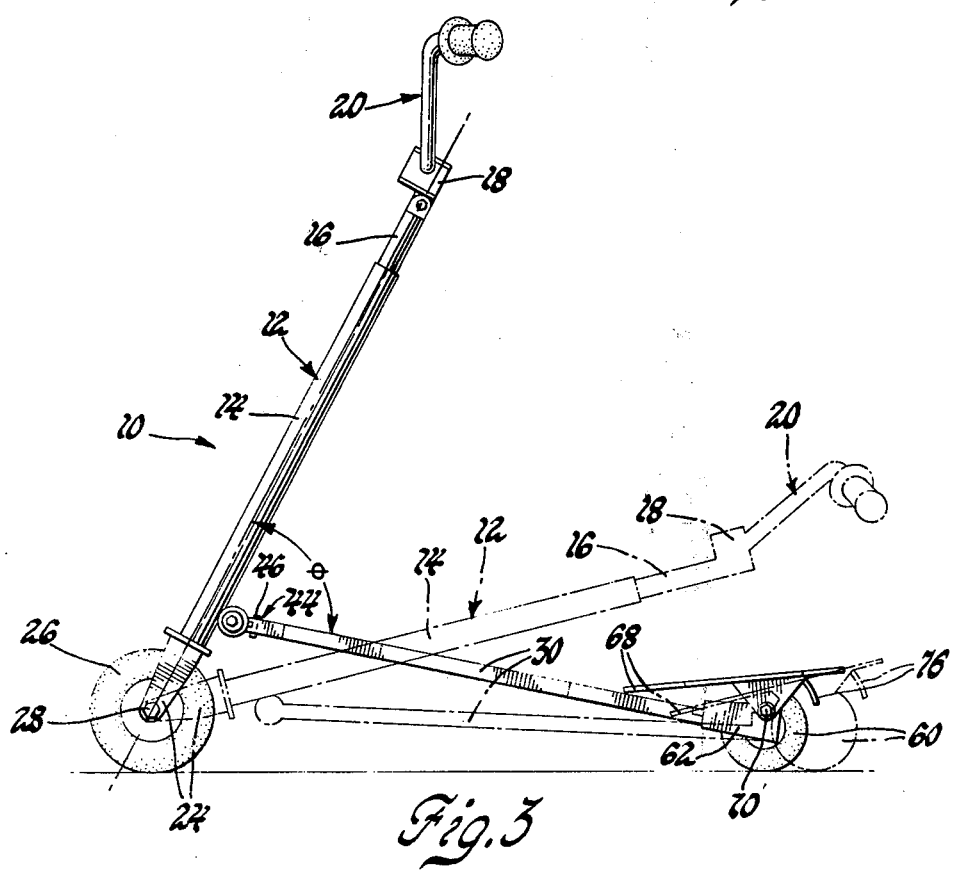
FIG. 3 is a side elevational view of the cambering vehicle of FIG. 1 and shows the vehicle in the normal operating position and also in the folded position.

Referring to the drawings and more particularly FIGS. 1-3, a cambering vehicle is shown which is adapted to be propelled in a forward direction by a natural input from the vehicle operator through the timed shifting of his weight from one foot to the other coordinated with the left and right cambered steering of the vehicle in a sinuous path. The vehicle is identified by reference numeral 10 and includes a steering frame 12 comprising an inclined and elongated cylindrical steering column 14 that axially locates and rotatably supports a tubular steering shaft 16 extending therethrough. The upper end of steering shaft 16 mounts a centralized clamp 18 that adjustably supports a handlebar assembly 20. The clamp 18 carried by the upper end of shaft 16 can be constricted by conventional threaded fastener means (not shown) to hold the handlebar assembly 20 in an adjusted position. The steering shaft 16 has a lower bifurcated end 24 which provides a fork for a steerable front wheel 26. The wheel 26 rotates on an axle 28 which extends transversely through and is supported by the fork.

The vehicle 10 has a pair of tubular trailing arms 30 and 32 which are of equal length and respectively have their forward ends secured through spline connections to the opposed ends 34 and 36 of a torsion bar 38 as seen in FIG. 2. The torsion bar 38 is located in a transversely extending tube 40 which is rigid with the lower portion of the steering column 14 and has its longitudinal center axis perpendicular to the longitudinal center axis of the steering frame 12. It will be noted that the cylindrical central portion 42 of the torsion bar 38 is held in a fixed position relative to the steering frame 12. In this regard, the central portion 42 is located within an accommodating bore 43 and is fixed to the tube 40 by a locking member 44 comprising a knob 46 integrally formed with a threaded shank 48 which terminates with a projection 50. The projection 50 extends into a bore 52 located in the central portion 42 when the knob is rotated in a clockwise direction as seen in FIG. 1 and when the trailing arms 30 and 32 are positioned as seen in full lines in FIG. 3 relative to the steering frame 12. It should be apparent that with this construction each trailing arm is mounted for up and down swinging movement about the longitudinal center axis of the torsion bar 38 on opposite sides of steering column 14. During such movement, the reduced intermediate portions 54 and 56 of the torsion bar 38 experience the usual torsional windup and serve as spring members for returning the associated trailing arm to the normal position relative to the steering frame 12 as seen in FIGS. 1 and 3.

Right and left rear wheels 58 and 60 are rotatably mounted on axles (not shown) which extend laterally and outwardly from the free end of trailing arms 30 and 32, respectively. In addition to supporting the rear wheels 58 and 60, the free ends of trailing arms 30 and 32 have mounting brackets 62 and 64 secured respectively thereto for right and left foot pads 66 and 68 adapted to support the feet of the vehicle operator. As best shown in FIGS. 1 and 3, the foot pads 66 and 68 are located above the rear wheels 58 and 60 and are tiltably mounted on pivot pins 70 and 72 carried by brackets 62 and 64, respectively. Foot pad 66 disposed above wheels 58 has an outwardly extending friction brake member 74 secured thereto that directly engages the outer periphery of the wheel 58 when the pad is rocked rearwardly on pivot pin 72 by the operator to effect braking of wheel 58. The rearward rocking action occurs when the operator transfers his weight to his heels. In a forward tilt position of pad 58, the brake member 74 is spaced from wheel 58 so that the wheel can freely rotate. In a like manner, foot pad 68 has an outwardly extending brake member 76 secured thereto which is adapted to directly engage and brake the left rear wheel 60 when pad 68 is rocked rearwardly on pivot pin 70 by the vehicle operator. In the forward tilt position of this pad, the brake member 76 is spaced from the wheel 60 so that it may roll freely.

As seen in FIG. 1 and in full line in FIG. 3, when the vehicle 10 is at rest, the trailing arms 30 and 32 are normally located in a plane that forms an angle $\theta$ which is slightly less than 90° with the longitudinal center axis of the steering column 14. Also, the torsion bar 38 serves to maintain the trailing arms 30 and 32 and steering column 14 in the aforesaid relative position so when the vehicle 10 is not in use and located on a level surface, it remains upright in a stable parked position. The wheels 26, 58 and 60 will be located in vertical planes at such time.

If it is desired to stow the vehicle, the knob 46 is rotated in a counterclockwise direction to cause the projection 50 to be moved outwardly relative to the bore 52 so as to allow the central portion 42 to be unlocked from the tube 40. This then permits the frame portion 12 to be rotated clockwise about the longitudinal center axis of the torsion bar 38 to the phantom line position seen in FIG. 3. At this point, a second bore 78 is aligned with the projection 50 of the locking member 44 permitting the latter to be rotated clockwise to position the projection in the bore 78 and once again lock the central portion 42 to the tube 40 so that the trailing arms 30 and 32 and the steering frame 12 are located in the relative positions shown in phantom lines in FIG. 3 wherein the steering column 14 and trailing arms are substantially aligned.

One manner of operating the vehicle 10 described above is explained in the aforementioned patent application Ser. No. 649,967. For present purposes it will suffice to mention that the vehicle 10 can be propelled by having the operator first grasping the handlebar assembly 20 and placing one foot on one foot pad with the latter in the forward tilted position and using his other foot to push off the support surface to give the vehicle an initial velocity. After pushing off, the operator places his feet on their respective foot pads 66 and 68 so that the operator input can be imparted into the vehicle for forward propulsion. Initially the operator distributes his weight to his right foot and camber steers the vehicle in an arcuate path towards the left. This causes the trailing arm 32 to move downwardly relative to the steering frame 12 to increase the angle $\theta$ and cause a torsional windup of the intermediate portion 56. At the same time, the trailing arm 30 will move upwardly relative to steering frame 12 to decrease the angle $\theta$ and cause a windup of the intermediate portion 54 in an opposite direction. During such movement, the wheels 58 and 60 will remain in substantially parallel planes in contact with the support surface.

With the vehicle turning on the above-mentioned arcuate path, the right gear wheel 58 has a turning radius which is greater than the turning radius of the inside or left rear wheel 60. While holding the circular path of the vehicle substantially constant during this turning action and as he leans the vehicle into the turn the operator shifts his weight from his right to his left foot and thus to the left rear wheel 60 causing the trailing arm 30 to move upwardly to decrease the angle $\theta$ and to cause the trailing arm 32 to move downwaardly to increase the angle $\theta$. Since the angular momentum has not changed, the shift of the operator's mass to a smaller radius will naturally result in an increase in vehicle velocity. The operator subsequently cambers and steers the vehicle in an opposite direction so that is describes an arcuate path about another center point. Since the beginning of the second half of the operating cycle the mass of the operator is over the left rear wheel 60, velocity can be again increased by the operator shifting his weight from his left to his right foot. Thus the operator's mass is moved from a larger radius to a smaller radius to again increase net velocity. By repeating this action a net forward travel of the vehicle is achieved. The cambering of the vehicle during the work cycle facilitates operation. With cambering, the track of the vehicle is widened so that the amount of work per cycle is increased. The self propulsion is most effective on flat smooth surfaces where relative high speeds may be obtained.

While the manually propelled cambering vehicle 10 has been illustrated and described with wheels providing the three-point contact, it should be understood that ice runners or skis may be readily substituted for the wheels. Such modifications are shown in the aforementioned patent application Ser. No. 659,967.

FIGS. 4-6 show a modified version of the cambering vehicle described above. In this case, the vehicle is generally indicated by the reference numeral 80, and rather than having a torsion bar for connecting the trailing arms to the steering frame 81, the trailing arms take the form of leaf spring members 82 and 84 which extend rearwardly and respectively terminate with rotatable rear wheels 86 and 88. The trailing arms are of equal length and are rigidly formed with support brackets 90 and 92 which together with the ends of the spring members rotatably support the rear wheels 86 and 88 along laterally extending axles (not shown). Foot pads 94 and 96 for supporting the right foot and left foot of the operator are disposed above the wheels 86 and 88 and are mounted for limited rocking motion about pivot bolts 98 and 100. Each of the foot pads 94 and 96 has the rear end thereof formed with an arcuate friction brake member 102 which serves to frictionally engage the peripheral surface of the associated rear wheel for vehicle braking when the operator transfers his weight to his heels as explained hereinbefore.

The front ends of the leaf spring 82 and 84 are respectively secured to cylindrical bosses 104 and 106 which are mountable within the ends of the tube 108 fixed with the lower portion of the steering frame 81. Thus, as seen in FIG. 5, the front end of the leaf spring 82 can be assembled to the tube 108 by sliding the boss 104 into the complementary opening 110 formed in the left side of the tube. A transverse slot 112 of a size corresponding to the cross sectional size of the leaf spring 82 adjacent the boss 104 allows the latter to move into the opening 110. Once the boss 104 is positioned in the opening, a T-shaped lock pin 113 extends through an opening 114 formed in a slot 116 which is identical in configuration to the slot 112 and passes into and through an accommodating opening 117 formed in the boss 104 and through an opening in the lower end of tube 108 diametrically opposite to opening 114. In this manner, the front end of the leaf spring 82 is secured to the steering frame 81.

The front end of the leaf spring 84 similarly has the boss 106 positioned within a complementary opening formed in the right side of the tube 108. A slot 118 identical to slot 112 is transversely aligned with the latter slot for receiving the body portion of the leaf spring 84. A lock pin 120 is provided for securing the boss 106 in the tube 108 and passes through the circular opening 122 formed in the slot 124 into the accommodating opening 126 formed in the boss 106 and then into a similar sized opening in the lower end of the tube 108. Circular opening 128 and 130 are provided in the slots 112 and 118 for receiving the lock pins 113 and 120 for purposes to be explained hereinafter.

The steering frame 81 is provided with a front wheel 132 which is rotatably supported by a fork 134 that is secured to a flat support plate 136 fixed with the lower end of a steering shaft 138 that is rotatably carried by a tubular column 140 which forms a part of the steering or main frame. The upper end of the steering shaft 138 is secured to a handlebar assembly 142 by a clamp 144 so upon the normal rotation of the handlebar assembly 142, the wheel 132 can be steered in the usual manner.

In the normal rest or parked position of the vehicle 80 as seen in FIG. 4, the rear wheels 86 and 88 and the front wheel 132 will be located in parallel vertical planes assuming the handlebar assembly 142 is set in a straight-ahead direction. Also, the spring members 82 and 84 will be transversely aligned as in the case of the trailing arms 30 and 32 of the vehicle 10 seen in FIG. 3 so as to form a similar angle θ with the longitudinal axis of the steering frame 81. However, when the vehicle operator is cornering the vehicle 80 to the left as seen in FIG. 6, the rear wheel 88 will move downwardly relative to the steering frame 81 to increase the angle θ, while the rear wheel 86 will move upwardly to decrease the angle θ. The rear wheels 86 and 88 will tend to remain in substantially parallel planes during the cornering maneuver. When the vehicle 80 is cornering to the right, the rear wheels 86 and 88 will move in opposite directions as explained in connection with the vehicle 10.

The vehicle 80 can be operated in the same manner as explained relative to vehicle 10 for propelling the vehicle forwardly. Also, if it should be desired to stow the vehicle 80 after operation, the lock pins 113 and 120 are first removed from the tube 108 to unlock the spring members 82 and 84. The latter members are then shifted laterally outwardly relative to the steering column 140 to remove the bosses 104 and 106 from the tube 108. The bosses 104 and 106 are then repositioned in the side openings of the tube 108 so that the body portions of the spring members 82 and 84 are respectively located within the slots 116 and 124 resulting in the spring members being positioned substantially parallel to the steering frame 81. The lock pins 113 and 120 can then be placed in the openings 128 and 130 respectively to again lock the spring members to the steering frame.

It should be noted that in the case of both vehicles 10 and 80 described above, the spring members utilized for connecting the trailing arms to the steering frame will be sized so as to have the desirable spring rate for providing cambering of the vehicle during operation thereof. Also, the leaf spring members incorporated with the vehicle 80 would preferably be made from a suitable metal but if desired they can be made of a plastic material.

Various changes and modifications can be made in this construction without departing from the spirit of the invention. Such changes and modifications are contemplated by the inventor and he does not wish to be limited except by the scope of the appended claims.

I claim:

1. A three-point surface contact cambering vehicle having a longitudinally extending roll axis and comprising an upright steering column, an elongated steering shaft mounted in said steering column for turning movement about a substantially vertical axis, a steerable front surface contact means operatively connected to the lower end of said steering shaft for engagement with a support surface, a manual steering device operatively connected to the upper end of said steering shaft, a pair of elongated trailing arms extending rearwardly from said steering column and each having a front portion and a rear portion, laterally spaced rear surface contact means operatively connected to the rear portions of said trailing arms for engagement with the support surface, foot support means for an operator of the vehicle mounted on each of said trailing arms adjacent to each of said rear surface contact means, and spring means connecting the front portions of said trailing arms to said steering column and serving as the sole support for permitting said trailing arms to swing about a transverse axis and thereby allow the operator to roll said vehicle with respect to said roll axis and cause said trailing arms to move in opposite directions so that the rear surface contact means camber by an amount substantially equal to the vehicle roll.

2. A three-point surface contact cambering vehicle having a longitudinally extending roll axis and comprising an upright steering column, an elongated steering shaft mounted in said steering column for turning movement about a substantially vertical axis, a steerable front surface contact means operatively connected to the lower end of said steering shaft for engagement with a support surface, a manual steering device operatively connected to the upper end of said steering shaft, a pair of elongated trailing arms extending rearwardly from said steering column, laterally spaced rear surface contact means operatively connected to the rear portions of said trailing arms for engagement with the support surface, foot support means for an operator of the vehicle mounted on each of said trailing arms adjacent to each of said rear surface contact means, and a torsion bar connecting said trailing arms to said steering column for normally maintaining the trailing arms in predetermined positions relative to the steering column and for permitting said trailing arms to swing about a transverse axis and thereby allow the operator to roll said vehicle with respect to said roll axis and cause said trailing arms to move in opposite directions so that the rear surface contact means camber by an amount substantially equal to the vehicle roll.

3. A cambering vehicle having an upright steering frame the lower portion of which is provided with a pair of pivotally supported trailing arms, a torsion bar connecting said trailing arms to the steering frame so that the trailing arms move in opposite directions in parallel planes when the vehicle is leaned into a turn, said steering frame including a tubular member secured thereto for housing said torsion bar along an axis extending transversely to the longitudinal axis of the steering frame, cooperating means connecting the forward ends of said trailing arms to the opposite ends of the torsion bar, and a lock member carried by said tubular member for selectively securing a portion of said torsion bar in a first position wherein said trailing arms are located for normal operation of said vehicle and for securing said portion of said torsion bar in a second position wherein said trailing arms are located adjacent said frame so the vehicle can be stowed in a minimum of space.

4. A cambering vehicle having a longitudinally extending roll axis and comprising an upright steering column, an elongated steering shaft rotatably mounted in said steering column for turning movement about a substantially vertical axis, a steerable wheel operatively connected to the lower end of said steering shaft for engagement with a support surface, a manual steering device operatively connected to the upper end of said steering shaft, a pair of elongated trailing arms extending rearwardly in diverging directions from said steering column, laterally spaced rear wheels operatively connected to the rear portions of said trailing arms for engagement with the support surface, foot support means for an operator of the vehicle mounted on each of said trailing arms adjacent to each of said rear wheels, a torsion bar connecting the forward ends of said trailing arms to said steering column to permit said trailing arms to swing about a transverse axis and thereby allow the operator to roll said vehicle with respect to said roll axis and cause said trailing arms to move in opposite directions so that the rear wheels move in parallel planes and camber by an amount substantially equal to the vehicle roll, a transversely extending tube rigid with the steering column for housing said torsion bar, and a lock member for securing a central portion of said torsion bar to said tube for maintaining the trailing arms in a normal operating position relative to the steering column and for permitting the trailing arms to be folded into a position wherein the trailing arms are located adjacent to the steering column so as to facilitate stowage of the vehicle.

* * * * *